DIP LACQUERING OF ELECTRICAL COMPONENTS

Filed May 10, 1971

INVENTORS
NICO A. DE GIER
SIMON VAN DER KOOIJ
BY
Frank R. Trifari
AGENT 3,736,179
DIP LACQUERING OF ELECTRICAL COMPONENTS
Nico Arie de Gier and Simon van der Kooij, Emmasingel, Eindhoven, Netherlands, assignors to U.S. Philips Corporation, New York, N.Y.
Filed May 10, 1971, Ser. No. 141,479
Claims priority, application Netherlands, May 15, 1970, 7007041
Int. Cl. B44d *1/06*; C23c *9/00*
U.S. Cl. 117—201 3 Claims

ABSTRACT OF THE DISCLOSURE

Method of providing a cylindrical electrical component having radial connecting wires with a layer of lacquer by dipping in a viscous lacquer. The component is suspended from its connecting wires and partly immersed in the bath of lacquer. It is then moved through the lacquer at such a speed that a wave is produced in the lacquer so as to flush the surface of the component extending above the lacquer.

The invention relates to a method of providing a cylindrical electrical component having at least two, mainly radially extending, parallel connecting wires, with a layer of lacquer by dipping in a bath containing a viscous lacquer.

A cylindrical component is to be understood to mean a component a portion of the contour of which is formed by parallel straights.

A method of the kind set forth is known from British patent specification No. 910,407 where the component to be provided with a lacquer layer is immersed in the lacquer so far that the level of the lacquer cannot close above the upper portion of the component so that this portion remains uncoated. However, if the upper portion is also to be coated with a lacquer layer, the component is immersed to a depth such that the level of the lacquer closes above the component and around the connecting wires. The immersion depth required in practice is so large that the lacquer also extends on the portion of the connecting wires which is used for the soldering on a printed circuit board. In order to avoid electrically unreliable soldering connections, the undesired lacquer has to be removed from the wires. This causes a delay in the manufacturing process, and hence more expensive products.

The object of the invention is to provide a method by which the entire surface of the component can be coated with lacquer without the lacquer extending on the portion of the connecting wires to be eventually used for making soldering connections.

To this end the invention is characterized in that the electrical component, suspended from the connecting wires and its longitudinal axis parallel to the level of the lacquer, is partly dipped into the viscous lacquer and is moved through the lacquer at such a speed that a wave produced in the lacquer flushes the surface of the component extending above the lacquer, after which the component is withdrawn from the lacquer.

In a favourable embodiment of a method according to the invention a partition is arranged in the lacquer which extends above the lacquer level substantially as much as the partly immersed component, the component being moved towards the partition with its longitudinal axis parallel to the said partition.

In order that the invention may be readily carried into effect, one embodiment thereof will now be described in detail, by way of example, with reference to the accompanying diagrammatic drawing, in which.

Figure 1:
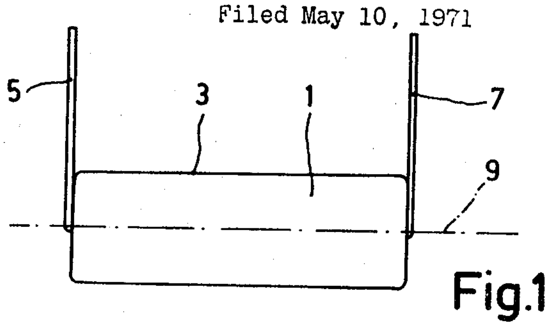
FIG. 1 shows one of the common electrical components at a larger scale.

The electrical component 1 shown in FIG. 1, for example, a capacitor, has a cylindrical outer jacket 3 from which two radially extending, mutually parallel connecting wires 5 and 7 extend. The connecting wires 5 and 7 may have a shape deviating from the shape shown in FIG. 1. One portion of a connecting wire, however, is always substantially parallel to a corresponding portion of the other connecting wire so as to make mounting on a printed circuit board possible. Its longitudinal axis 9 being in the horizontal position, the component 1, suspended from the connecting wires 5 and 7, is dipped into a viscous lacquer 13 in a bath 11 (see FIG. 2). Dipping may be performed according to a circular path if the component is suspended in a rotating device. The component 1 is preferably lowered into the lacquer bath, however, along a vertical path. This may be done, for example, along the path denoted by the reference numeral 15. The component is dipped into the lacquer 13 to a depth so that the lacquer surface with respect to the component is approximately at the level 17 which is indicated by a broken line. A portion of the outer jacket 3 of the component 1 is, therefore, not in contact with the lacquer 13. Of the connecting wire 5 visible in FIG. 2 only the portion 19 (up to the level 17) is in contact with the lacquer 13 immediately after immersion. A partition 21, the plane of which is parallel to the longitudinal axis 9 of the component 1 is arranged in the bath 11. After the component 1 has been immersed to the level 17 along the vertical path 15, the component is moved towards the partition 21 along a horizontal path. The longitudinal axis 9 of the component 1 then remains parallel to the plane of the partition 21. Due to the displacement of the component 1 towards the partition 21, the lacquer 13 is urged upwards between the component and the partition. The degree of urging depends mainly on the height by which the partition 21 protrudes above the bath. If the speed of movement of the component is such that the urging height would exceed the distance between the top of the partition 21 and the level 17, the lacquer will flow over the partition 21 to the portion of the bath 11 which is situated to the left of the partition. The partition 21 thus limits the urging height.

Figure 2:
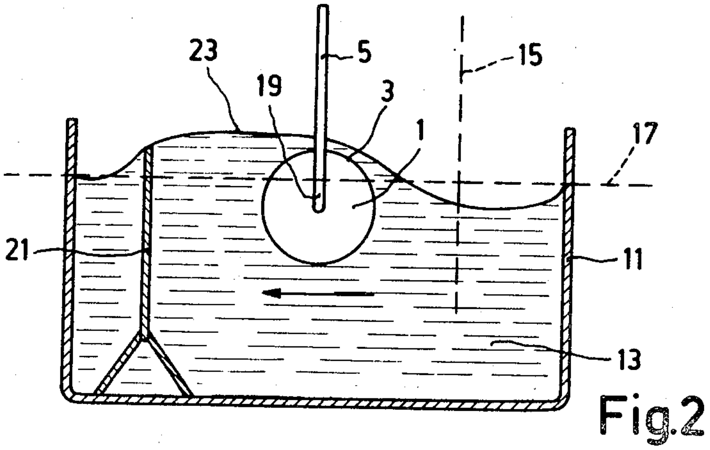
FIG. 2 shows the electrical component of FIG. 1 in a bath containing viscous lacquer in which a partition is arranged.
Figure 3:
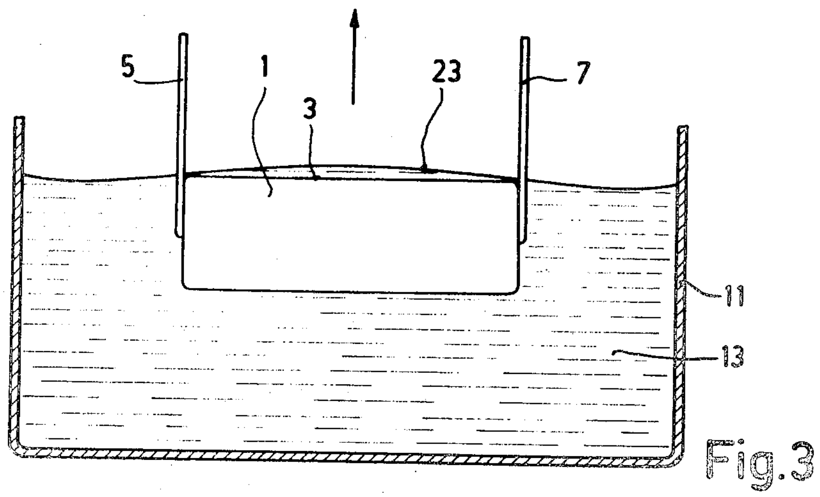
FIG. 3 is a cross-sectional view of the arrangement shown in FIG. 2.

In the position of the component 1 shown in FIG. 2, the level of the lacquer will approximately be shaped as indicated by the curved line 23. As the lacquer whcih is urged upwards between the component 1 and the partition 21 flows off in the lateral direction, the level of the lacquer 23, viewed in a cross-section of FIG. 2, has approximately the shape shown in FIG. 3. The speed at which the component 1 is moved through the lacquer 13 can easily be so controlled that the lacquer level at the area of the connecting wires 5 and 7 will be only slightly higher than the top side of the component 1 so that a minimum part of the portion of the connecting wires 5 and 7 extending outside the component 1 comes into contact with the lacquer. At the instant when the lacquer 13 has sufficiently flushed component 1, the component is withdrawn from the lacquer 13 along a vertical path. The lacquer is dried after the component has been withdrawn from the lacquer.

In a preferred embodiment of the method according to the invention, the component is moved to and fro along a horizontal path between two parallel partitions arranged in the lacquer. The component is thus covered with lacquer in a more symmetrical manner than in the embodiment using one partition.

Instead of moving the component in a stationary bath, it is alternatively possible to move the bath with respect to the component. If a partition is used which is movable with respect to the bath, it is of course also possible to move the partition in a stationary bath with respect to the component which is then stationary. Finally, it is possible to give the component a stationary position between two partitions which are movable towards the component. It will be obvious that alternatively a bath without partitions can be used. In that case one of the walls of the bath takes over the function of the partition.

What is claimed is:

1. A method of coating a cylindrical body of an electrical component with a layer of lacquer, the electrical component having two parallel connecting wires attached at one end thereof to said body and which extend substantially radially from the cylindrical body, the method comprising the steps of suspending the electrical component from its connecting wire with the longitudinal axis of the body of the component disposed parallel to the surface of the lacquer contained in a bath, partly immersing the body of the component into the bath of lacquer so that a portion of said cylindrical body extends above the undisturbed surface of said lacquer bath, causing relative movement between the lacquer and the body of the component so that lacquer flows over the exposed part of the surface of the body of the component, so that the major portions of the connecting wires are not coated with the lacquer, and removing the component from the lacquer.

2. The method as claimed in claim 1 wherein at least one partition is arranged within said bath of lacquer for controlling the extent to which said lacquer flows over said body, said partition extending above the lacquer to a level substantially equal to the extent said partly immersed component extends above the lacquer surface, and wherein said relative movement is caused by moving said partly exposed cylindrical body through said bath of lacquer toward the partition with its longitudinal axis parallel to the said partition, so that said lacquer will flow over the exposed surface of said body.

3. The method as claimed in claim 1 wherein two partitions are arranged within said bath for controlling the degree to which said lacquer flows over said body, and wherein said component is partly immersed by moving said component along a vertical path, into said bath and wherein said lacquer is caused to flow over the unexposed surface of said body by moving the component horizontally to and fro between the two partitions arranged in the lacquer so as to produce a lacquer wave and finally by withdrawing the component from the lacquer along a vertical path.

References Cited

UNITED STATES PATENTS

| | | | |
|---|---|---|---|
| 3,404,024 | 10/1968 | Lindemann | 117—113 |
| 3,020,877 | 2/1962 | Wallace | 118—425 |
| 2,078,214 | 4/1937 | Esselen | 117—115 X |
| 210,987 | 12/1878 | Brooks | 117—113 |

FOREIGN PATENTS

| | | | |
|---|---|---|---|
| 910,407 | 11/1962 | Great Britain | 117—113 |

ALFRED L. LEAVITT, Primary Examiner

M. F. ESPOSITO, Assistant Examiner

U.S. Cl. X.R.

117—113, 114 A, 114 B, 114 C, 114 R, 115, 116; 118—423, 424